(12) United States Patent
Callewaert

(10) Patent No.: US 10,793,093 B2
(45) Date of Patent: Oct. 6, 2020

(54) VEHICLE FASCIA RADAR STRUCTURES AND ASSEMBLIES

(71) Applicant: VEONEER US, INC., Southfield, MI (US)

(72) Inventor: Clyde M. Callewaert, Shelby Township, MI (US)

(73) Assignee: Veoneer US, Inc., Southfield, MI (US)

( * ) Notice: Subject to any disclaimer, the term of this patent is extended or adjusted under 35 U.S.C. 154(b) by 296 days.

(21) Appl. No.: 15/614,282

(22) Filed: Jun. 5, 2017

(65) Prior Publication Data
US 2018/0348362 A1   Dec. 6, 2018

(51) Int. Cl.
| | | |
|---|---|---|
| *B60R 19/48* | (2006.01) | |
| *G01S 13/931* | (2020.01) | |
| *H01Q 1/42* | (2006.01) | |
| *H01Q 1/32* | (2006.01) | |
| *B60R 19/18* | (2006.01) | |
| *G01S 7/02* | (2006.01) | |

(52) U.S. Cl.
CPC .......... *B60R 19/483* (2013.01); *G01S 13/931* (2013.01); *H01Q 1/3233* (2013.01); *H01Q 1/3283* (2013.01); *H01Q 1/421* (2013.01); *H01Q 1/422* (2013.01); *B60R 2019/1886* (2013.01); *G01S 2007/027* (2013.01); *G01S 2013/93275* (2020.01)

(58) Field of Classification Search
None
See application file for complete search history.

(56) References Cited

U.S. PATENT DOCUMENTS

| | | |
|---|---|---|
| 6,489,927 B2 | 12/2002 | LeBlanc et al. |
| 7,126,525 B2 | 10/2006 | Suzuki et al. |
| 2002/0067305 A1 | 6/2002 | LeBlanc et al. |
| 2014/0091969 A1 | 4/2014 | Shi et al. |
| 2015/0109162 A1 | 4/2015 | Binzer |

(Continued)

FOREIGN PATENT DOCUMENTS

WO   2016/182567   11/2016

OTHER PUBLICATIONS

International Search Report for PCT/US2018/036142 dated Aug. 28, 2018, 2 pgs.

(Continued)

*Primary Examiner* — Whitney Moore
(74) *Attorney, Agent, or Firm* — Matthew D. Thayne; Thayne and Davis LLC

(57) ABSTRACT

RADAR assemblies and related structures for vehicles. In some embodiments, a RADAR assembly may be provided comprising a RADAR module, a bracket coupled with the RADAR module, and a conformal layer comprising a surface configured to conform with and be positioned adjacent to a surface of a portion of vehicle fascia. The conformal layer may be configured to decrease the reflectivity of electromagnetic radiation from the RADAR module relative to the vehicle fascia. The RADAR assembly may be configured to be coupled with the vehicle fascia such that the conformal layer is spaced apart from the vehicle fascia to define an air gap between the conformal layer and the vehicle fascia, and the air gap may be configured to further decrease the reflectivity of electromagnetic radiation from the RADAR module relative to the vehicle fascia.

19 Claims, 7 Drawing Sheets

(56) References Cited

U.S. PATENT DOCUMENTS

| | | | |
|---|---|---|---|
| 2016/0231417 A1* | 8/2016 | Aoki | G01S 13/931 |
| 2016/0297437 A1 | 10/2016 | Hara et al. | |
| 2016/0370456 A1* | 12/2016 | Emanuelsson | H01Q 1/3233 |
| 2017/0023674 A1* | 1/2017 | Aleem | G01S 13/931 |
| 2019/0195986 A1* | 6/2019 | Hellinger | G01S 7/032 |

OTHER PUBLICATIONS

Written Opinion for PCT/US2018/036142, dated Aug. 28, 2018, 5 pgs.

* cited by examiner

VEHICLE FASCIA RADAR STRUCTURES AND ASSEMBLIES

SUMMARY

RADAR sensors and related RADAR assemblies are often mounted behind vehicle bumpers or other vehicle fascia. However, typical bumper fascia is less than 180 degrees in thickness relative to 24 GHz radio waves, which are frequently used in automotive RADAR sensors. Because the reflectivity of materials is typically highest at or near odd integer multiples of 90 degree thicknesses, and lowest at integer multiples of 180 degree thicknesses, these vehicle elements may not be ideal for avoiding RADAR reflection, which reduces transmitted power to RADAR targets and increases RADAR sensitivity to vibration, bumper/fascia feature lines, and generally decreases RADAR detection sensitivity and functionality.

The present inventors have therefore determined that it would be desirable to provide systems and methods that overcome one or more of the foregoing limitations and/or other limitations of the prior art. In some embodiments, the inventive concepts disclosed herein may take advantage of the fact that many current RADAR modules are mounted to vehicle fascia using a bracket. By modifying these brackets and/or otherwise modifying RADAR assemblies in various ways disclosed herein, RADAR detection sensitivity and functionality can be markedly improved. For example, in some embodiments, a layer may be positioned adjacent to the fascia or other element through which the radio waves or other electromagnetic radiation from the sensor(s) will pass in order to decrease reflectivity and/or otherwise improve functionality. This layer may be coupled with a RADAR assembly, such as the bracket, and may be configured to conform with various surface contours of the fascia. In some embodiments, a gap, such as an air gap, may be provided in between the layer and the fascia, which may further improve functionality or may at least allow for decreasing the needed thickness of the layer.

In a more particular example of a RADAR assembly for coupling with vehicle fascia according to some embodiments, the assembly may comprise a RADAR module, a bracket coupled with the RADAR module, and a conformal layer comprising a surface configured to conform with and be positioned adjacent to a surface of a portion of vehicle fascia. The conformal layer may be configured to decrease the reflectivity of electromagnetic radiation from the RADAR module relative to the vehicle fascia. In some embodiments, the RADAR assembly may be configured to be coupled with the vehicle fascia such that the conformal layer is spaced apart from the vehicle fascia to define an air gap between the conformal layer and the vehicle fascia. In some such embodiments, the air gap may be configured to further decrease the reflectivity of electromagnetic radiation from the RADAR module relative to the vehicle fascia.

In some embodiments, the bracket may comprise a window. The RADAR module may be positioned within the window. In some such embodiments, the bracket may further comprise a frame surrounding the window. The frame may comprise an exterior surface, and the conformal layer may be positioned within the frame such that an exterior surface of the conformal layer is at least substantially aligned with the exterior surface of the frame.

Some embodiments may further comprise an adhesive layer, such as a layer of tape, on the exterior surface of the frame, which may be configured to couple the frame to the vehicle fascia. In some such embodiments, the adhesive layer is configured to create the air gap between the conformal layer and the vehicle fascia upon coupling the bracket with the vehicle fascia. In some embodiments, the adhesive layer has a thickness at least substantially equal to a thickness of the air gap upon coupling the bracket with the vehicle fascia.

In another specific example of a RADAR assembly for coupling with vehicle fascia, the RADAR assembly may comprise a RADAR module, a bracket coupled with the RADAR module, and a conformal layer. The bracket may be coupled with the RADAR module and may comprise a window positioned within a frame comprising an exterior surface. The RADAR module may be positioned within the window. The conformal layer may comprise a surface configured to conform with and be positioned adjacent to a surface of a portion of vehicle fascia. The conformal layer may further be configured to decrease the reflectivity of electromagnetic radiation from the RADAR module relative to the vehicle fascia, and may be coupled with the frame such that the surface of the conformal layer extends at least substantially parallel to the exterior surface of the frame along at least opposing sides of the frame.

In some embodiments, the RADAR assembly may be configured to be coupled with the vehicle fascia such that the conformal layer is spaced apart from the vehicle fascia to define an air gap between the conformal layer and the vehicle fascia.

In some embodiments, the exterior surface of the frame may be configured to conform with and be positioned adjacent to a surface of a portion of the vehicle fascia. In some embodiments, one or more surfaces of the conformal layer may be curved, and may be configured to conform with one or more curved features of the vehicle fascia. One or more other surfaces of the conformal layer may be flat.

In an example of a vehicle according to some embodiments, the vehicle may comprise a fascia layer and a RADAR assembly coupled with the fascia layer. The RADAR assembly may comprise a RADAR module, a bracket coupled with the RADAR module, and a conformal layer positioned adjacent to an inner surface of the fascia layer and at least substantially conforming with surface features of the inner surface of the fascia layer. The conformal layer may be configured to decrease the reflectivity of electromagnetic radiation from the RADAR module relative to fascia layer.

Some embodiments may further comprise a gap, such as an air gap positioned in between the conformal layer and the fascia layer. In some embodiments, the air gap may be configured to further decrease the reflectivity of electromagnetic radiation from the RADAR module relative to the fascia layer.

Some embodiments may further comprise an adhesive layer coupled between the bracket and the fascia layer. In some such embodiments, the adhesive layer may be positioned and configured to form the air gap. In some embodiments, the adhesive layer may have a thickness at least substantially identical to a thickness of the air gap.

In some embodiments, the bracket may comprise a window positioned within a frame comprising an exterior surface. The RADAR module may be positioned within the window.

In some embodiments, the exterior surface of the frame may at least substantially conform with surface features of the inner surface of the fascia layer.

The features, structures, steps, or characteristics disclosed herein in connection with one embodiment may be combined in any suitable manner in one or more alternative embodiments.

BRIEF DESCRIPTION OF THE DRAWINGS

Non-limiting and non-exhaustive embodiments of the disclosure are described, including various embodiments of the disclosure with reference to the figures, in which.

DETAILED DESCRIPTION

A detailed description of apparatus, systems, and methods consistent with various embodiments of the present disclosure is provided below. While several embodiments are described, it should be understood that the disclosure is not limited to any of the specific embodiments disclosed, but instead encompasses numerous alternatives, modifications, and equivalents. In addition, while numerous specific details are set forth in the following description in order to provide a thorough understanding of the embodiments disclosed herein, some embodiments can be practiced without some or all of these details. Moreover, for the purpose of clarity, certain technical material that is known in the related art has not been described in detail in order to avoid unnecessarily obscuring the disclosure.

Apparatus, methods, and systems are disclosed herein relating to RADAR assemblies. More particularly, in some embodiments, the RADAR assembly may comprise a conformal layer that may be configured to be positioned adjacent to a portion of vehicle fascia, such as behind a vehicle bumper, or another element through which the electromagnetic radiation of a RADAR module/sensor will pass. In some embodiments, a gap, such as an air gap, may be provided in between the conformal layer and the vehicle fascia.

The embodiments of the disclosure may be best understood by reference to the drawings, wherein like parts may be designated by like numerals. It will be readily understood that the components of the disclosed embodiments, as generally described and illustrated in the figures herein, could be arranged and designed in a wide variety of different configurations. Thus, the following detailed description of the embodiments of the apparatus and methods of the disclosure is not intended to limit the scope of the disclosure, as claimed, but is merely representative of possible embodiments of the disclosure. In addition, the steps of a method do not necessarily need to be executed in any specific order, or even sequentially, nor need the steps be executed only once, unless otherwise specified. Additional details regarding certain preferred embodiments and implementations will now be described in greater detail with reference to the accompanying drawings.

Figure 1:
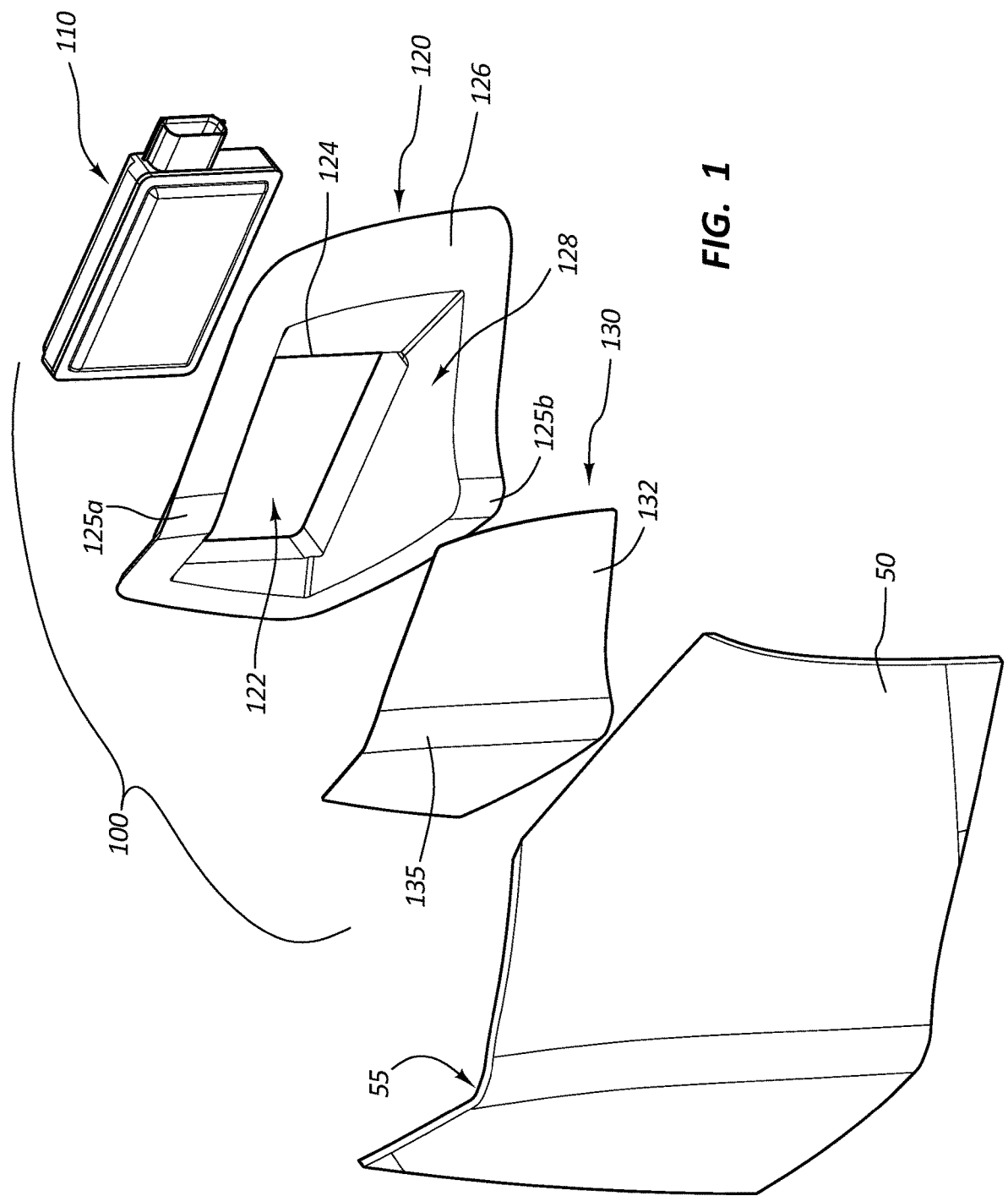
FIG. 1 is an exploded, perspective view of a vehicle RADAR assembly and a portion of vehicle fascia to which the vehicle RADAR assembly is configured to be coupled according to some embodiments.
Figure 2:
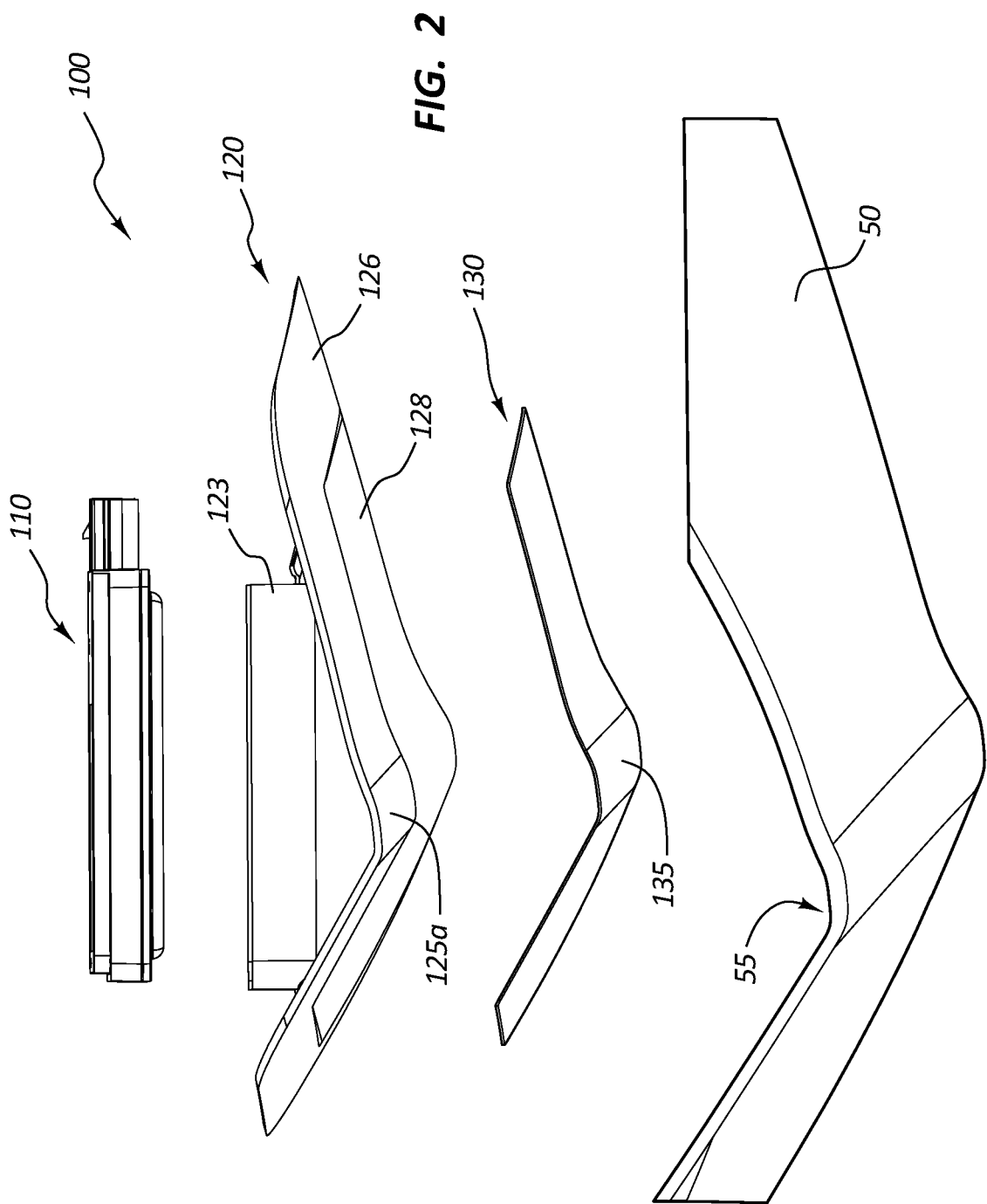
FIG. 2 is another exploded view of the vehicle RADAR assembly and vehicle fascia of FIG. 1.

FIGS. 1 and 2 are exploded views of an example of a RADAR assembly 100 configured for coupling with a portion of vehicle fascia 50, such as a portion of a vehicle bumper, of a vehicle. RADAR assembly 100 comprises a RADAR module 110, a bracket 120 configured to receive RADAR module 110, and a conformal layer 130 configured to be coupled with bracket 120.

Figure 3:
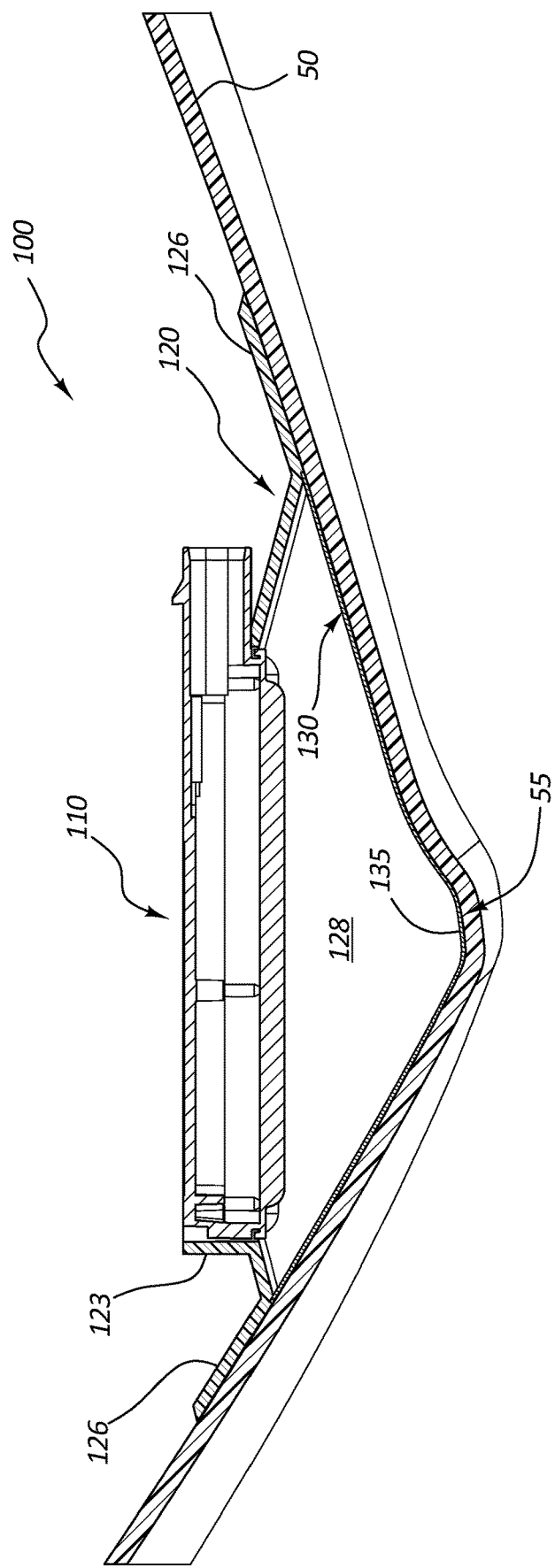
FIG. 3 is a cross-sectional view of the vehicle RADAR assembly and vehicle fascia of FIGS. 1 and 2.
Figure 4:
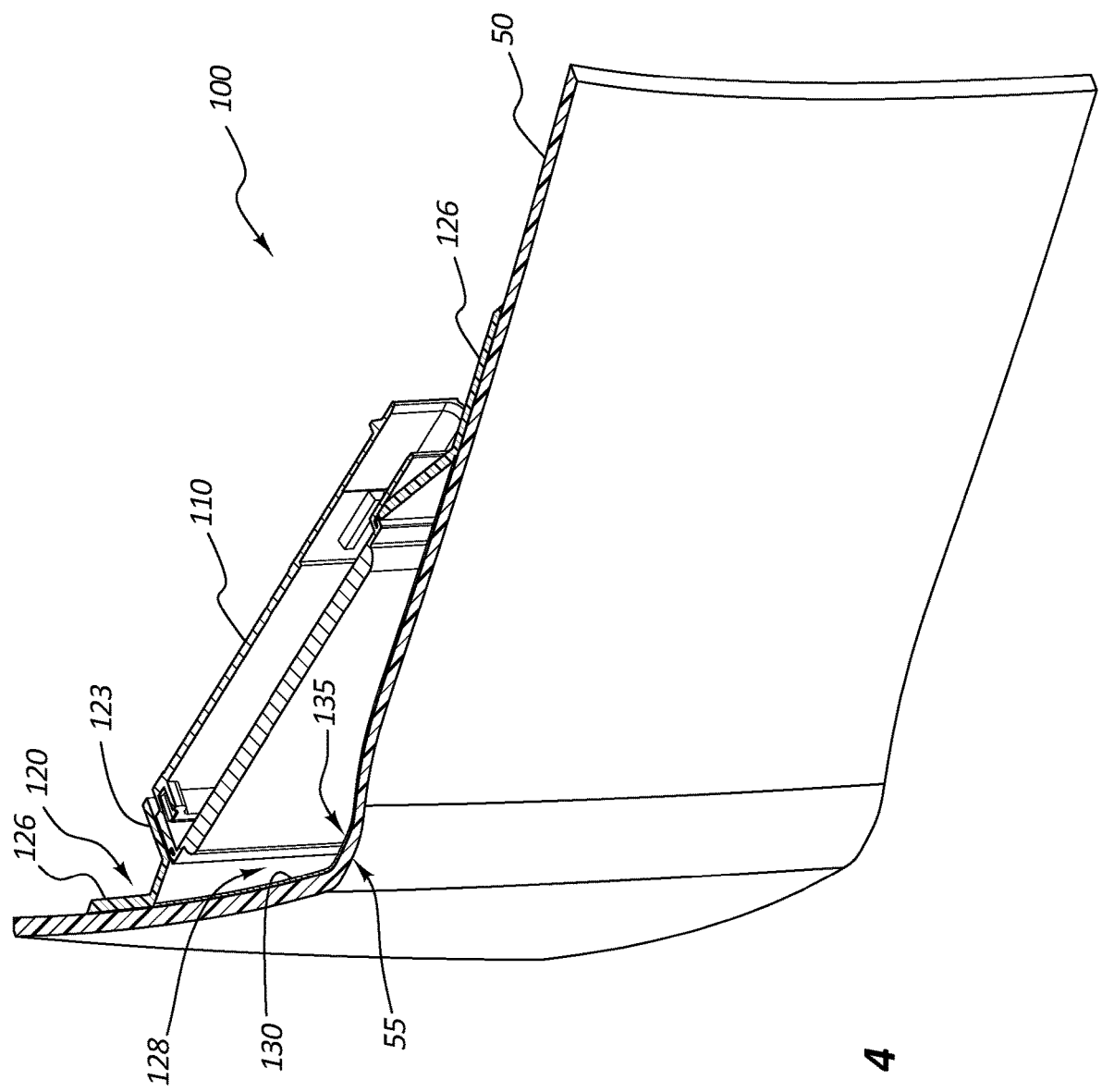
FIG. 4 is a cross-sectional, perspective view of the vehicle RADAR assembly and vehicle fascia of FIGS. 1-3.

Bracket 120 comprises a window 122 defined by a frame 124. Window 122 is configured to receive and engage RADAR module 110. A portion of bracket 120 may comprise an exterior surface that is configured to conform with and be positioned adjacent to an inner surface of a portion of the vehicle fascia 50, as better depicted in figures described below. More particularly, a conformal surface 126 extending about an outer perimeter of an inner portion of bracket 120 may be configured to conform with and be positioned adjacent to an inner surface of a portion of the vehicle fascia 50. In addition, as also described in greater detail below, conformal surface 126 may be configured to smoothly transition to conformal layer 130 when conformal layer 130 is coupled with bracket 120. A recessed portion 128 of bracket 120 may be configured to provide spacing between conformal layer 130 and RADAR module 110. As best seen in FIGS. 3 and 4, recessed portion 128 may allow for RADAR module 110 to extend directly across a curved portion of vehicle fascia 50, such as curved portion 55, without requiring the RADAR module and/or an entire inner surface of bracket 120 to conform with this curvature.

Conformal layer 130 comprises an outer surface 132 that is preferably configured to conform with and be positioned adjacent to an inner surface of vehicle fascia 50. As described herein, conformal layer 130 may be configured to decrease the reflectivity of radio waves or other electromagnetic radiation generated from RADAR module 110 relative to the adjacent vehicle fascia 50. For example, in the depicted embodiment, a curved portion 135 of the outer surface of conformal layer 130 may be configured with a curvature that matches and mates with, or at least substantially matches and mates with, a curvature of the inner surface of vehicle fascia 50 at curved portion 55.

In addition, in some embodiments, one or more portions of bracket 120 may also be configured to conform, or at least substantially conform, with a portion of the inner surface of vehicle fascia 50 and/or an adjacent portion of conformal layer 130. Thus, as shown in FIG. 1, opposing portions 125a and 125b of bracket 120 may similarly be configured with a curvature that matches and mates with, or at least substantially matches and mates with (nests within) a curvature of the inner surface of vehicle fascia 50 at curved portion 55 and that substantially matches and mates with (by forming a surface that is aligned with and/or smoothly transitions with the conformal layer) a curvature of conformal layer 130 at curved portion 135.

Conformal layer 130 may be coupled with bracket 120 by, for example, providing one or more grooves configured to receive an outer edge of conformal layer 130. In this manner, conformal layer 130 may be coupled with bracket 120 by way of a snap-fit coupling, particularly in embodiments in which conformal layer 130 is somewhat flexible, either by way of the material used to form conformal layer 130, the thickness of conformal layer 130, or both. In some embodiments, conformal layer 130 may be made up of a relatively rigid material, such as a rigid thermoplastic material. In some embodiments, the thermoplastic material may comprise, for example, the acrylonitrile butadiene styrene (ABS) or a polycarbonate-ABS material (PC-ABS). In some embodiments, conformal layer 130 may be coupled with bracket 120 using other means for coupling, such as, for example, an adhesive, fasteners, such as screws, bolts, or rivets, or by welding.

Although conformal layer 130 is shown having a uniform thickness, in some embodiments conformal layer 130 may vary in thickness as needed in order to minimize reflectivity or otherwise improve RADAR sensor functionality. For example, in some embodiments, conformal layer 130 may comprise a greater thickness in regions adjacent to vehicle fascia 50 that may have a decreased thickness, and vice versa. In addition, in some embodiments, the thickness of conformal layer 130 may vary in order compensate for undesirable features in vehicle fascia 50, such as sharp corners and regions of high curvature.

In some embodiments, the thickness of conformal layer 130 may relate to the thickness of the adjacent fascia 50 or another component, vehicle component or otherwise. For example, preferably, the conformal layer 130 (or the combination of the conformal layer and an adjacent air gap or other gap, as discussed below), is less than the thickness of the adjacent vehicle fascia 50 throughout the conformal layer 130. In some such embodiments, the thickness of conformal layer 130 (or, as mentioned above, the combined thickness of the conformal layer and an adjacent gap) may be between about 30% and about 120% of the thickness of the adjacent vehicle fascia.

As best shown in FIGS. 2-4, bracket 120 may further comprise a RADAR module housing 123 comprising one or more walls (in some embodiments, four walls) that are configured to at least partially define window 122 and/or otherwise receive and facilitate coupling of RADAR module 110 with bracket 120.

Figure 5:
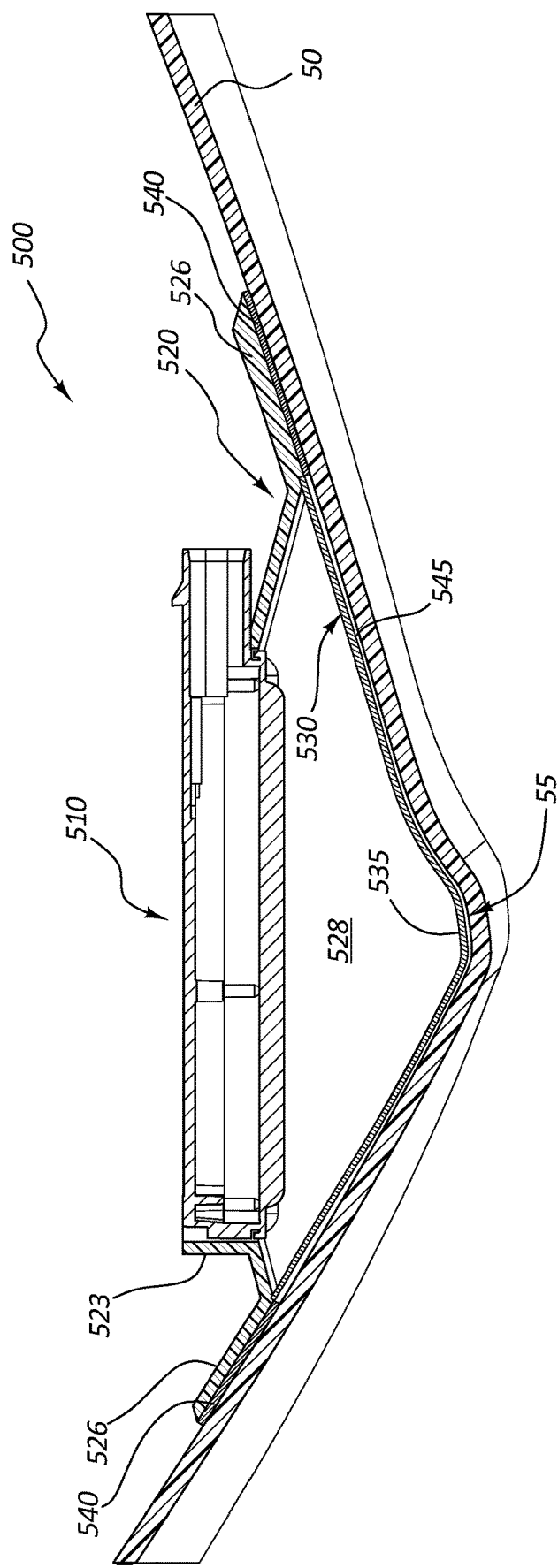
FIG. 5 is a cross-sectional view of a vehicle RADAR assembly and a portion of vehicle fascia to which the vehicle RADAR assembly is configured to be coupled according to other embodiments.
Figure 6:
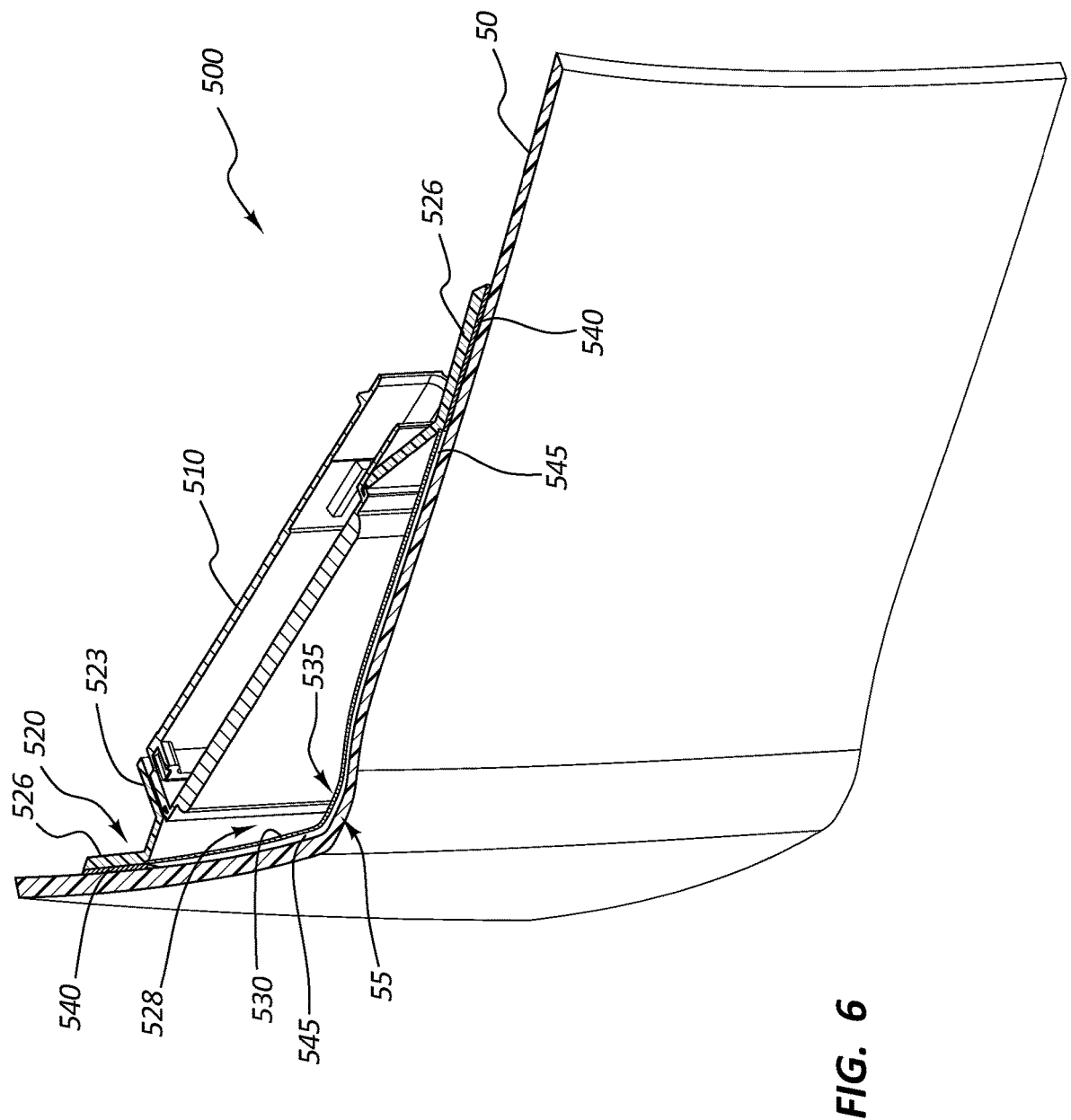
FIG. 6 is a cross-sectional, perspective view of the vehicle RADAR assembly and vehicle fascia of FIG. 5.

FIGS. 5 and 6 depict another embodiment of a RADAR assembly 500 shown coupled with a portion of vehicle fascia 50, such as a portion of a vehicle bumper, of a vehicle. FIG. 5 is a cross-sectional view of RADAR assembly 500 coupled with vehicle fascia 50 and FIG. 6 is a perspective, cross-sectional view of RADAR assembly 500 coupled with vehicle fascia 50.

Like RADAR assembly 100, RADAR assembly 500 comprises a RADAR module 510, a bracket 520 configured to receive RADAR module 110, and a conformal layer 530 configured to be coupled with bracket 520.

Similarly, bracket 520 comprises a frame, which may define a window and/or housing 523 that is configured to receive and engage RADAR module 510. A portion of bracket 520 again comprises a conformal surface 526 configured to conform with and be positioned adjacent to an inner surface of a portion of the vehicle fascia 50. However, RADAR assembly 500 further comprises an adhesive layer 540 positioned between bracket 520 and vehicle fascia 50. In some embodiments, adhesive layer 540 may comprise, for example, one or more pieces of double-sided tape of sufficient strength to retain RADAR assembly 500 in position adjacent to a portion of a vehicle.

As also shown in FIG. 5, conformal layer 530 is spaced apart from vehicle fascia 50 to define a gap 545 between the conformal layer 530 and the vehicle fascia 50. This gap 545, which may comprise an air gap in some embodiments, may be configured to further decrease the reflectivity of electromagnetic radiation from the RADAR module 510 relative to the vehicle fascia 50. Providing an air gap or another type of gap may be useful to adjust the phase angle of the radio waves or other electromagnetic radiation relative to an adjacent antennae and/or sensor without requiring additional conformal layer material/thickness. Thus, preferably gap 545 and/or conformal layer 530 are designed to minimize the reflectivity of electromagnetic radiation from the RADAR module 510 relative to the vehicle fascia 50 alone, which may be done by attempting to provide one or more thicknesses that are an integer multiple of half-wavelengths of the radio waves or other electromagnetic waves that will extend through the vehicle fascia 50 and adjacent layers provided by RADAR assembly 500 to decrease the reflectivity of the material relative to the signal(s) from one or more antennae of RADAR assembly 500. Gap 545 may also be useful in providing room for compression of tape or another adhesive layer 540.

In the depicted embodiment, the thickness of gap 545 may be dictated by the thickness of adhesive layer 540. In other words, because conformal layer 530 in the depicted embodiment is coupled with bracket 520 such that an exterior surface of the conformal layer is at least substantially aligned with the exterior surface of the bracket 520 (more particularly, with the exterior surface of conformal surface 526 of the frame of bracket 520), providing an adhesive layer 540 of a given thickness results in a thickness of gap 545 that is at least substantially equal to the thickness of adhesive layer 540. However, in alternative embodiments, the thickness or thicknesses of gap 545 need not be dictated by the thickness of adhesive layer 540. For example, in some embodiments, conformal layer 530 may be coupled with bracket 520 at another location, such as internally of conformal surface 526, so as to create a gap 545 of any desired thickness.

Although, in the depicted embodiment gap 545 has a thickness that is uniform, similar to conformal layer 530, alternative embodiments are contemplated in which gap 545 and/or conformal layer 530 may have non-uniform thicknesses. Such thicknesses may be adjusted in desired regions, for example, in order to account for the curvature of vehicle fascia 50 and/or provide for decreased reflectivity based upon varying distances to a plurality of RADAR antennae.

As also shown in FIGS. 5 and 6, RADAR assembly 500 may comprise one or more of the other features previously described in connection with RADAR assembly 100. For example, a recessed portion 528 of bracket 520 may be configured to provide spacing between conformal layer 530 and RADAR module 510. In addition, conformal layer 530 comprises an outer surface that is configured to conform with (mate with) and be positioned adjacent to an inner surface of vehicle fascia 50. Thus, in the depicted embodiment, a curved portion 535 of the outer surface of conformal layer 530 is configured with a curvature that matches and mates with, or at least substantially matches and mates with, a curvature of the inner surface of vehicle fascia 50 at curved portion 55.

In some embodiments, one or more portions of bracket 520 may also be configured to conform, or at least substantially conform, with a portion of the inner surface of vehicle fascia 50 and/or an adjacent portion of conformal layer 530. Thus, as shown in FIGS. 5 and 6, conformal portions/surfaces 526 may have a surface matching the adjacent surface of vehicle fascia 50. In addition, although not depicted in FIGS. 5 and 6, in some embodiments, one or more other portions may have a curvature that matches and mates with, or at least substantially matches and mates with, a curvature of a portion of the inner surface of vehicle fascia 50, for example, along curved portion 55.

Figure 7:
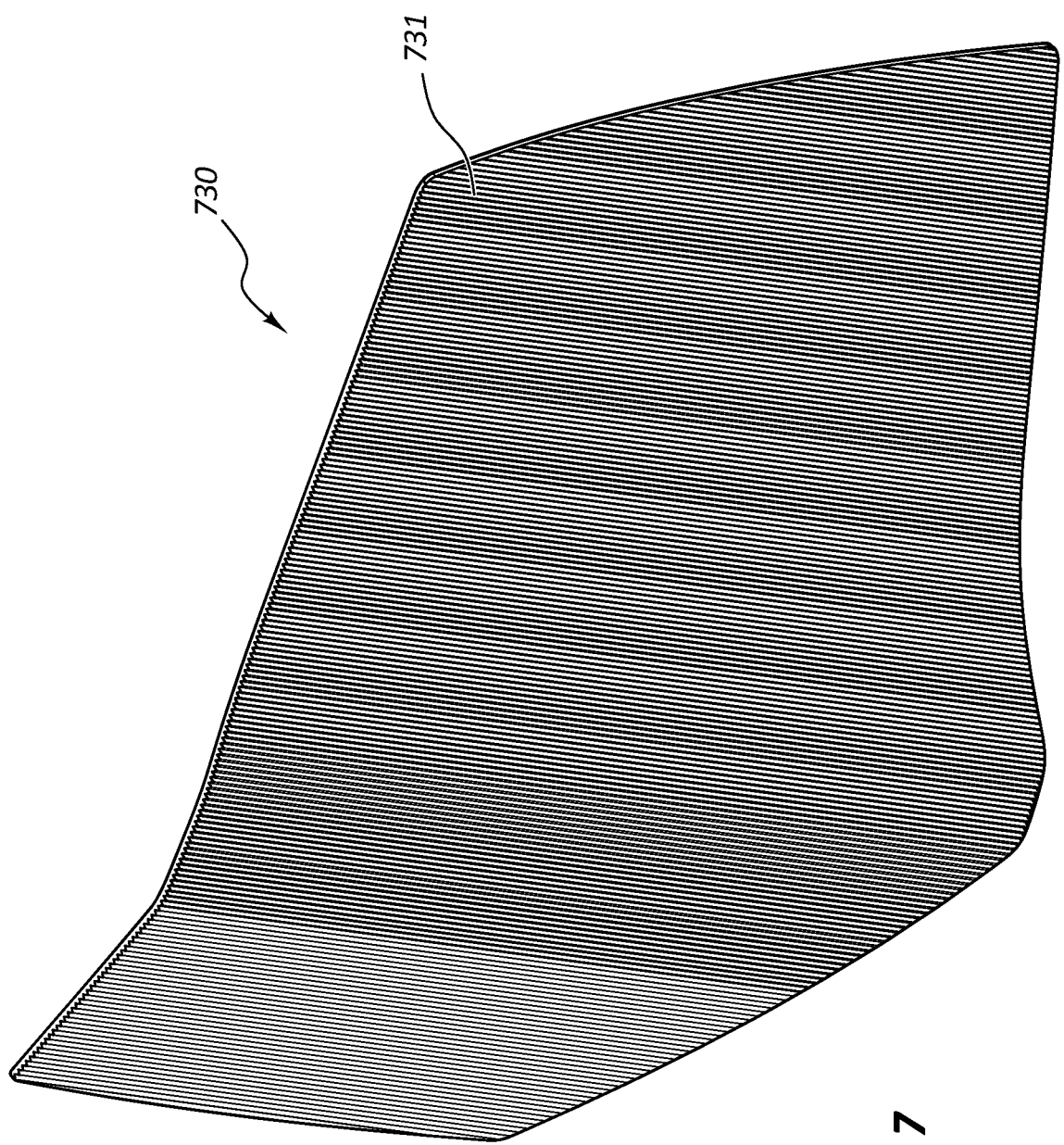
FIG. 7 depicts an alternative embodiment of a conformal layer having a textured surface.

In some embodiments, one or more portions of the conformal layer may have a textured surface, such as a grooved surface. For example, a surface of another embodiment of a conformal layer 730 is depicted in FIG. 7. Conformal layer 730 comprises a grooved surface 731 defined by a plurality of parallel grooves. This surface may further decrease reflectivity relative to radio waves or other electromagnetic radiation with which conformal layer 730 will be used. In addition, grooved surface 731 may decohere reflected electromagnetic radiation to further improve RADAR sensor functionality.

In some embodiments, various parameters/aspects of the grooves or other surface texture/pattern may be tuned as needed, in some cases in accordance with the accompanying radio waves or other electromagnetic radiation. For example, in some embodiments, the grooves may be formed in parallel rows that are cross-polarized, or at least substantially cross-polarized, relative to the accompanying radio waves or other electromagnetic radiation. Additionally, or alternatively, the periodicity and/or depth of the grooves may be tied to the accompanying radio waves or other electromagnetic radiation. Thus, for example, in some embodiments, the grooves in grooved surface 731 may be formed to have a periodicity distance or width that is less than about 1/10 of a free-space wavelength of electromagnetic radiation from an adjacent RADAR module, such as RADAR modules 110 and 510. In some such embodiments, the grooves in grooved surface 731 may be formed to have a periodicity distance or width that is between about 1/20 and about 1/10 of a free-space wavelength of electromagnetic radiation from an adjacent RADAR module, such as RADAR modules 110 and 510. However, in other embodiments, a slightly greater periodicity distance may be acceptable for certain applications. Thus, in some embodiments, the grooves in grooved surface 731 may be formed to have a periodicity distance or width that is between about 1/20 and about 1/4 of a free-space wavelength of electromagnetic radiation from an adjacent RADAR module.

In some embodiments, the grooves of grooved surface 731 may define a series of parallel pointed projections that may be in the shape of triangles in cross-section. In some embodiments, these shapes may have sharp tips and corresponding sharp troughs in between adjacent tips. However, in other embodiments, the tips and/or troughs of these grooves may instead be rounded.

In addition, in some embodiments the grooved or otherwise textured surface may be positioned on an inner surface of the conformal layer (inner relative to the vehicle). However, alternative embodiments are contemplated in which this may be applied to the outer surface, or to both the inner and outer surfaces.

The foregoing specification has been described with reference to various embodiments and implementations. However, one of ordinary skill in the art will appreciate that various modifications and changes can be made without departing from the scope of the present disclosure. For example, various operational steps, as well as components for carrying out operational steps, may be implemented in various ways depending upon the particular application or in consideration of any number of cost functions associated with the operation of the system. Accordingly, any one or more of the steps may be deleted, modified, or combined with other steps. Further, this disclosure is to be regarded in an illustrative rather than a restrictive sense, and all such modifications are intended to be included within the scope thereof. Likewise, benefits, other advantages, and solutions to problems have been described above with regard to various embodiments. However, benefits, advantages, solutions to problems, and any element(s) that may cause any benefit, advantage, or solution to occur or become more pronounced, are not to be construed as a critical, a required, or an essential feature or element.

Those having skill in the art will appreciate that many changes may be made to the details of the above-described embodiments without departing from the underlying principles of the invention. The scope of the present inventions should, therefore, be determined only by the following claims.

The invention claimed is:

1. A RADAR assembly for coupling with vehicle fascia, comprising:
 a RADAR module;
 a bracket coupled with the RADAR module, wherein the bracket comprises a window, and wherein the RADAR module is positioned within the window; and
 a conformal layer comprising a surface configured to conform with and be positioned adjacent to a surface of a portion of vehicle fascia such that the conformal layer is positioned between the vehicle fascia and the RADAR module,
  wherein the conformal layer is configured to decrease the reflectivity of electromagnetic radiation from the RADAR module relative to the vehicle fascia, wherein the RADAR assembly is configured to be coupled with the vehicle fascia such that the conformal layer is spaced apart from the vehicle fascia to define an air gap between the conformal layer and the vehicle fascia, wherein the air gap is configured to further decrease the reflectivity of electromagnetic radiation from the RADAR module relative to the vehicle fascia, wherein a combined thickness of the air gap and the conformal layer is linked to a thickness of adjacent vehicle fascia to decrease the reflectivity of electromagnetic radiation from the RADAR module relative to the vehicle fascia, wherein the bracket further comprises a frame surrounding the window, wherein the frame comprises an exterior surface, and wherein the conformal layer is positioned within the frame.

2. The RADAR assembly of claim 1, wherein the conformal layer is positioned within the frame such that an exterior surface of the conformal layer is at least substantially aligned with the exterior surface of the frame.

3. The RADAR assembly of claim 1, further comprising an adhesive layer on the exterior surface of the frame, wherein the adhesive layer is configured to couple the frame to the vehicle fascia.

4. The RADAR assembly of claim 1, and wherein the adhesive layer is configured to create the air gap between the conformal layer and the vehicle fascia upon coupling the bracket with the vehicle fascia.

5. The RADAR assembly of claim 4, wherein the adhesive layer has a thickness at least substantially equal to a thickness of the air gap upon coupling the bracket with the vehicle fascia.

6. The RADAR assembly of claim 1, wherein the combined thickness of the air gap and the conformal layer is selected to result in at least substantially an integer multiple of half wavelengths of electromagnetic waves from the RADAR module.

7. A RADAR assembly for coupling with vehicle fascia, comprising:
- a RADAR module;
- a bracket coupled with the RADAR module, wherein the bracket comprises a window positioned within a frame comprising an exterior surface, and wherein the RADAR module is positioned within the window;
- a conformal layer comprising a surface configured to conform with and be positioned adjacent to a surface of a portion of vehicle fascia, wherein the conformal layer is positioned between the vehicle fascia and the RADAR module such that the conformal layer decreases the reflectivity of electromagnetic radiation from the RADAR module relative to the vehicle fascia, and wherein the conformal layer is coupled with the frame such that the surface of the conformal layer extends beyond and at least substantially parallel to the exterior surface of the frame along at least opposing sides of the frame; and
- a gap between the conformal layer and the vehicle fascia, wherein a combined thickness of the conformal layer and the gap is selected to at least substantially minimize reflectivity of electromagnetic radiation from the RADAR module relative to the vehicle fascia.

8. The RADAR assembly of claim 7, wherein the exterior surface of the frame is configured to conform with and be positioned adjacent to a surface of a portion of the vehicle fascia.

9. The RADAR assembly of claim 7, wherein the surface of the conformal layer is a non-flat surface.

10. The RADAR assembly of claim 9, wherein the surface comprises a curved portion configured to conform with a curved feature of the vehicle fascia.

11. The RADAR assembly of claim 10, wherein the surface further comprises a flat portion.

12. The RADAR assembly of claim 7, wherein the combined thickness of the conformal layer and the gap is between about 30% and about 120% of the thickness of the adjacent vehicle fascia.

13. A vehicle, comprising:
- a fascia layer;
- a RADAR assembly coupled with the fascia layer, wherein the RADAR assembly comprises:
  - a RADAR module;
  - a bracket coupled with the RADAR module;
  - a conformal layer positioned adjacent to an inner surface of the fascia layer in between the fascia layer and the RADAR module and at least substantially conforming with surface features of the inner surface of the fascia layer, wherein the conformal layer is configured to decrease the reflectivity of electromagnetic radiation from the RADAR module relative to fascia layer; and
- a gap positioned in between the conformal layer and the fascia layer, wherein the gap is configured to further decrease the reflectivity of electromagnetic radiation from the RADAR module relative to the fascia layer.

14. The vehicle of claim 13, further comprising an adhesive layer coupled between the bracket and the fascia layer.

15. The vehicle of claim 14, wherein the gap comprises an air gap, and wherein the adhesive layer is positioned and configured to form the air gap.

16. The vehicle of claim 15, wherein the adhesive layer has a thickness at least substantially identical to a thickness of the air gap.

17. The vehicle of claim 13, wherein the bracket comprises a window positioned within a frame comprising an exterior surface, and wherein the RADAR module is positioned within the window.

18. The vehicle of claim 17, wherein the exterior surface of the frame at least substantially conforms with surface features of the inner surface of the fascia layer.

19. The vehicle of claim 17, further comprising an adhesive layer positioned between the exterior surface of the frame and the inner surface of the fascia layer.

* * * * *